United States Patent
Bohn et al.

(10) Patent No.: US 9,172,856 B2
(45) Date of Patent: Oct. 27, 2015

(54) FOLDED IMAGING PATH CAMERA

(75) Inventors: David D. Bohn, Fort Collins, CO (US); Frank Preiss, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 798 days.

(21) Appl. No.: 13/074,521

(22) Filed: Mar. 29, 2011

(65) Prior Publication Data

US 2012/0249815 A1 Oct. 4, 2012

(51) Int. Cl.
*H04N 5/225* (2006.01)

(52) U.S. Cl.
CPC .......... *H04N 5/2254* (2013.01); *H04N 5/2257* (2013.01)

(58) Field of Classification Search
CPC .................................................. H04N 5/2254
USPC ......................................................... 348/335
See application file for complete search history.

(56) References Cited

U.S. PATENT DOCUMENTS

| | | | |
|---|---|---|---|
| 5,889,553 A * | 3/1999 | Kino et al. | 348/218.1 |
| 6,285,501 B1 | 9/2001 | Suzuki | |
| 6,377,404 B1 | 4/2002 | Goosey, Jr. | |
| 6,816,156 B2 * | 11/2004 | Sukeno et al. | 345/207 |
| 6,992,699 B1 * | 1/2006 | Vance et al. | 348/207.99 |
| 7,420,592 B2 * | 9/2008 | Freeman | 348/219.1 |
| 7,561,191 B2 | 7/2009 | May et al. | |
| 7,563,037 B2 | 7/2009 | Chang | |
| 7,616,393 B2 | 11/2009 | Border et al. | |
| 7,760,996 B2 | 7/2010 | Miyamori et al. | |
| 2004/0130647 A1 * | 7/2004 | Kuba | 348/335 |
| 2004/0141086 A1 * | 7/2004 | Mihara | 348/335 |
| 2006/0092524 A1 * | 5/2006 | Konno | 359/678 |
| 2007/0212046 A1 * | 9/2007 | Sogoh et al. | 396/55 |
| 2007/0297781 A1 * | 12/2007 | Kitano | 396/55 |
| 2009/0002797 A1 * | 1/2009 | Kwong et al. | 359/225 |
| 2009/0122406 A1 | 5/2009 | Rouvinen et al. | |
| 2009/0161235 A1 * | 6/2009 | Border et al. | 359/726 |

FOREIGN PATENT DOCUMENTS

JP       2006195085 A  *  7/2006  ............. G03B 17/17

OTHER PUBLICATIONS

Merriam Webster Online Dictionary; Lens Definition, p. 4; URL: http://www.merriam-webster.com/dictionary/lens.*

(Continued)

*Primary Examiner* — Roberto Velez
*Assistant Examiner* — Cynthia Segura
(74) *Attorney, Agent, or Firm* — Gregg Wisdom; Judy Yee; Micky Minhas

(57) ABSTRACT

In embodiments of a folded imaging path camera, a device includes a camera lens module that focuses an image, which is received as reflected light. An image sensor captures the image from the reflected light that is directed at the image sensor. The device also includes one or more optics that fold the reflected light of the image along an imaging path directed through the camera lens module and directed at the image sensor. The imaging path directed through the camera lens module can be approximately perpendicular to an axis along which the reflected light of the image is received via an aperture in the device. Alternatively, the imaging path directed through the camera lens module is approximately parallel to the axis along which the reflected light of the image is received via the aperture in the device.

20 Claims, 7 Drawing Sheets

(56) References Cited

OTHER PUBLICATIONS

Merriam Webster Online Dictionary; Prism Definition, p. 2; URL: http://www.merriam-webster.com/dictionary/prism.*
Merriam Webster Online Dictionary; Diverge Definition, p. 1; URL: http://www.merriam-webster.com/dictionary/diverge.*
Merriam Webster Online Dictionary; Refract Definition, p. 1; URL: http://www.merriam-webster.com/dictionary/refract.*
Wilson, Andrew, "Folded optics makes cameras smaller", Retrieved at << http://www.optoiq.com/index/machine-vision-imaging-processing/display/vsd-article-display/291748/articles/vision-systems-design/volume-12/issue-5/technology-trends/lens-design/folded-optics-makes-cameras-smaller.html >>, May 1, 2007, pp. 2.
Ricker, Thomas, "Samsung announces world's thinnest 8 megapixel cellphone module", Retrieved at << http://www.engadget.com/2008/03/18/samsung-announces-worlds-thinnest-8-megapixel-cellphone-module/ >>, Mar. 18, 2008, pp. 3.
"Baltic 617 Target Applications", Retrieved from: www.varioptic.com on Mar. 22, 2011, 1 Page.

* cited by examiner

FOLDED IMAGING PATH CAMERA

BACKGROUND

Mobile consumer devices, such as cell phones, media players, and tablet computers, typically incorporate a camera module so that a device may also be used as a camera. These types of devices are increasingly designed to be thinner and incorporate smaller and/or thinner components. Current camera modules are simple axial optical systems and the optical axis through the camera lens is perpendicular to the face of a device, such as when a device is integrated with a camera in a front or back of the device. The camera lens is stacked on top of an image sensor that captures an image which is focused through the camera lens. This thickness or depth of a camera module that includes a camera lens, an image sensor, and circuit board is commonly referred to as the z-height (e.g., in the z-axis) of the camera module. The z-height of conventional camera modules may exceed the thickness of the devices that are increasingly designed to be thinner and incorporate the smaller and/or thinner components.

Further, consumers typically prefer cameras that are designed with more megapixels for sharper images. However, the size of a camera lens in a camera module is based on the size of the image sensor, and as image sensors increase in pixel count, they also increase in size to accommodate more megapixels. Consumer preferences for thinner devices with better cameras are adverse design limitations. Cameras that have more megapixels also incorporate a larger camera lens, which increases the z-height of a camera module. Further, to implement a zoom lens, the camera lens in a camera module moves away from the image sensor to effectuate magnification of an image. If the camera lens does not protrude out from the device when zooming, then the zoom mechanism integrated into a device will increase the thickness of the device.

SUMMARY

This Summary introduces simplified concepts of a folded imaging path camera, and the concepts are further described below in the Detailed Description and/or shown in the Figures. This Summary should not be considered to describe essential features of the claimed subject matter, nor used to determine or limit the scope of the claimed subject matter.

A folded imaging path camera is described. In embodiments, a device includes a camera lens module that focuses an image, which is received as reflected light. An image sensor captures the image from the reflected light that is directed at the image sensor. The device also includes one or more optics that fold the reflected light of the image along an imaging path directed through the camera lens module and directed at the image sensor. The imaging path directed through the camera lens module can be approximately perpendicular to an axis along which the reflected light of the image is received via an aperture in the device. Alternatively, the imaging path directed through the camera lens module is approximately parallel to the axis along which the reflected light of the image is received via the aperture in the device.

In other embodiments, the optics include of one or more mirrors, one or more prisms, and/or one or more optical lenses. The optics can be implemented to fold the reflected light once along the imaging path directed through the camera lens module and directed at the image sensor. Alternatively, the optics can be implemented to first fold the reflected light along the imaging path directed through the camera lens module and second fold the reflected light directed at the image sensor. Alternative imaging paths having multiple folds can also be implemented.

In other embodiments, dimensions of the device include a height dimension, a width dimension, and a depth dimension. The imaging path for the reflected light of the image is approximately parallel, at least in part, to a first axis along the height dimension of the device, or a second axis along the width dimension of the device. Further, an optical axis of the camera lens module is approximately parallel to the first axis along the height dimension of the device, or the second axis along the width dimension of the device. The camera lens module may be implemented for reverse telephoto imaging and configured to increase or decrease a distance between the camera lens module and the image sensor.

In other embodiments, a device includes a camera lens module that focuses an image, which is received as reflected light via an aperture in an end of the device. The device also includes an integrated display that displays the image as the image is received. An image sensor captures the image from the reflected light that is directed at the image sensor. The device also includes one or more optics that fold the reflected light of the image along an imaging path and directed at the image sensor. The imaging path from the aperture and through the camera lens module is approximately parallel to a horizontal plane of the integrated display, which is also approximately parallel to an axis along which the reflected light of the image is received via the aperture in the end of the device.

BRIEF DESCRIPTION OF THE DRAWINGS

Embodiments of a folded imaging path camera are described with reference to the following Figures. The same numbers may be used throughout to reference like features and components that are shown in the Figures.

DETAILED DESCRIPTION

A folded imaging path camera is described, and embodiments provide an optical system having a folded imaging path for use in thin consumer devices that include an integrated camera. A folded imaging path camera includes optics, such as mirrors, prisms, and/or lenses that fold reflected light of an image along an imaging path directed through a camera lens module and directed at an image sensor. An optical axis of the camera lens can be orientated parallel to the face of a device, which provides that the camera lens module and image sensor may be positioned at different lateral locations in a thinner consumer device. The folded imaging path also enables incorporation of a zoom mechanism, and the camera lens module can be optimized for a longer back focal length to implement a reverse telephoto lens. The camera lens module may also be implemented with an auto-focus mechanism and/or image stabilization.

A folded imaging path camera can also be implemented for optical image stabilization and/or to generate high resolution images (e.g., also referred to as super resolution images) with a tilting lens. A tilting lens can be implemented as an element of the camera lens module, and can be implemented with a liquid lens or a liquid crystal lens that provides variable focus and variable tilt for both auto-focus and optical image stabilization. A device that includes a folded imaging path camera can also include orientation sensors, such as one or more gyroscopes, and the tilting lens can be tilted to compensate for camera shake based on sensor inputs. The imaging lens of the camera lens module can also be tilted with implementation of an actuator or other type of tilting mechanism.

The device that includes a folded imaging path camera can also include an image processing service that processes captured image data. For implementations of a super or high resolution technique, the image data for an image can be captured at a nominal position and then also at one-half pixel offset positions as the imaging lens is tilted. The image processing service can then combine the nominal position image and the various offset position images to generate a high resolution image.

While features and concepts of a folded imaging path camera can be implemented in any number of different devices, systems, environments, networks, and/or configurations, embodiments of a folded imaging path camera are described in the context of the following example devices, systems, and methods.

Figure 1:
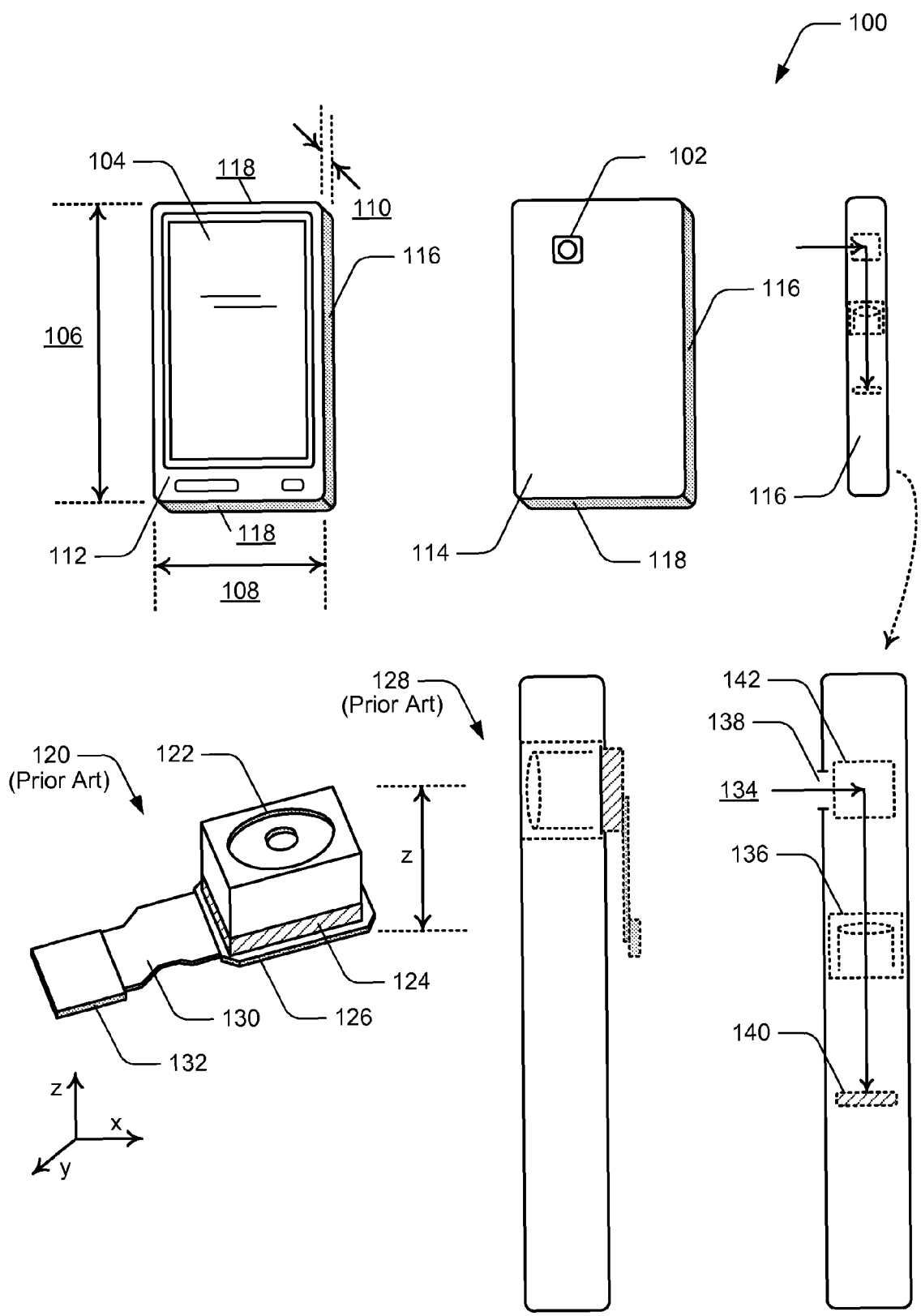
FIG. 1 illustrates an example device in which embodiments of a folded imaging path camera can be implemented.

FIG. 1 illustrates an example device 100 in which embodiments of a folded imaging path camera can be implemented. The example device may be any type of a portable and/or consumer device, such as a cell phone, media player, tablet computer, gaming device, digital camera, and the like. The computing device can be implemented with various components, such as one or more processors, memory devices that enable data storage of digital images, as well as any number and combination of differing components as further described with reference to the example device shown in FIG. 7.

In this example, the device 100 includes an integrated camera 102 that is implemented as a folded imaging path camera in accordance with one or more embodiments. The device also includes an integrated display 104 that can display a representation of an image that is viewed through the camera. The example device has a height dimension 106, a width dimension 108, and a depth dimension 110. A front face 112 of the device includes the integrated display, and the front face and a back face 114 of the device are defined by the height dimension and the width dimension. The device includes two sides 116 that are defined by the height dimension and the depth dimension of the device. The device also includes two ends 118 that are defined by the width dimension and the depth dimension of the device.

A conventional camera module 120 is shown to illustrate that a camera lens 122 stacked on top of an image sensor 124 and circuit board 126 has a z-height (e.g., in the z-axis) that may limit implementation of the camera module in a thin consumer device at 128 (e.g., example device 100 has a thinner form factor than the z-height of the conventional camera module). The camera module also includes other components, such as a flex circuit 130 and a circuit board connector 132. Rather than a conventional stacked configuration of the camera module components, the components of the integrated camera 102 in the device 100 implement a folded imaging path 134.

In embodiments, the integrated camera 102 includes a camera lens module 136 that focuses an image received as reflected light, such as via an aperture 138 in the device. The integrated camera also includes an image sensor 140 that captures the image from the reflected light that is directed at the image sensor. The integrated camera also includes one or more optics 142 that fold the reflected light of the image along the imaging path directed through the camera lens module and directed at the image sensor. In this configuration, an optical axis of the camera lens is parallel to the face (e.g., the integrated display) of the device, which provides that the camera lens module and image sensor can be positioned at different lateral locations in a thinner consumer device. Various configurations and implementations of folded imaging path cameras are described with reference to FIGS. 2-4.

Figure 2:
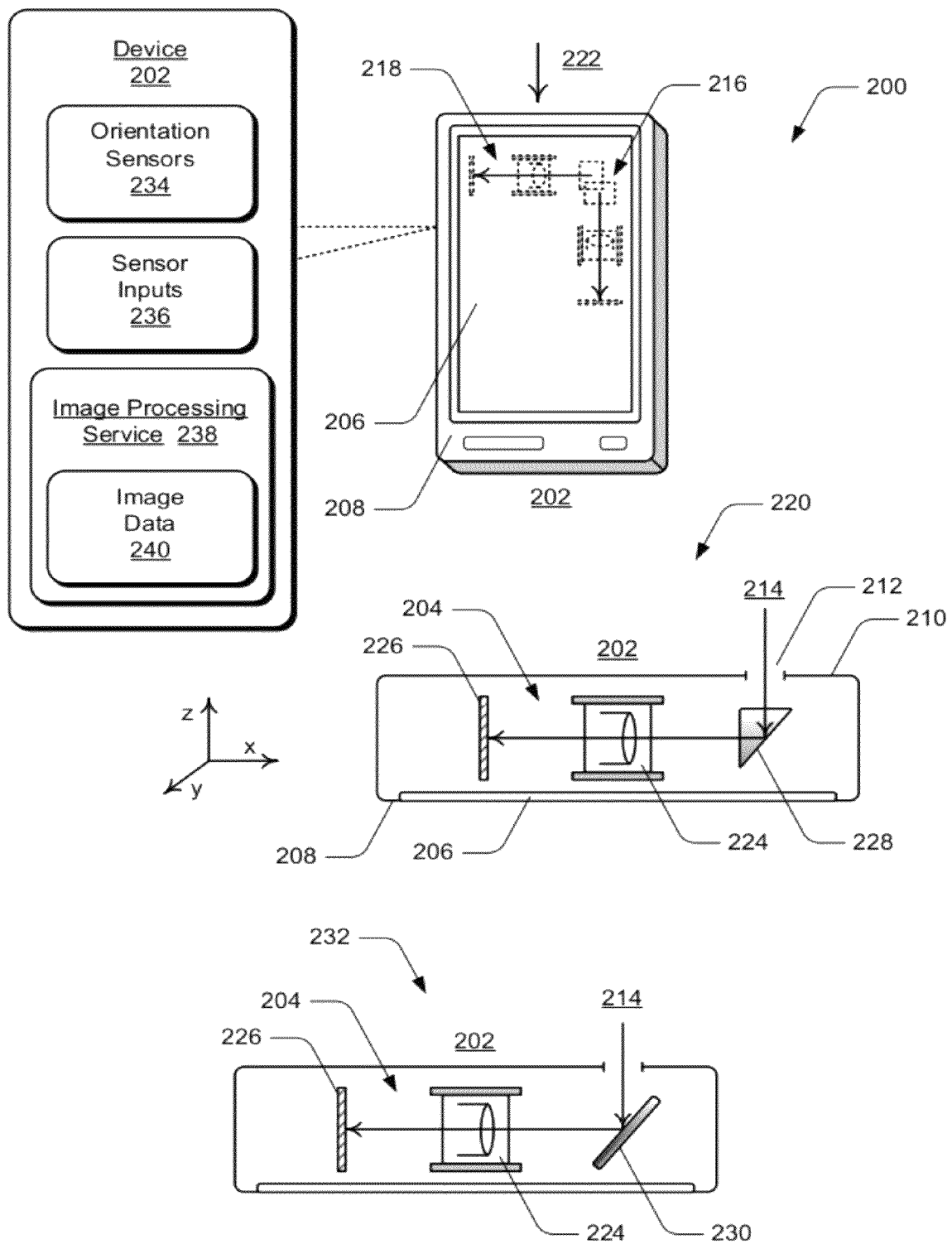
FIG. 2 illustrates examples of a device that includes implementations of a folded imaging path camera in accordance with one or more embodiments.

FIG. 2 illustrates examples 200 of a device 202 that includes implementations of a folded imaging path camera 204. The device 202 may be implemented as any type of device described with reference to FIG. 1. For example, the device may include a display 206 that is integrated in a front face 208 of the device. A back face 210 of the device includes an aperture 212 via which reflected light of an image is received and directed along an imaging path 214. Alternatively or in addition, the front face of the device may include an aperture through which the reflected light of the image is received. In embodiments, a folded imaging path camera can be implemented in a device in a vertical configuration 216. Alternatively, a folded imaging path camera can be implemented in a device in a horizontal configuration 218, as shown at 220 from the perspective 222.

The folded imaging path camera includes a camera lens module 224 with an autofocus mechanism and an image sensor 226. The camera lens module focuses the image received as the reflected light and the image sensor captures the image from the reflected light that is directed at the image sensor. The folded imaging path camera also includes one or more optics, such as a prism 228 that folds the reflected light of the image along the imaging path directed through the camera lens module and directed at the image sensor. Alternatively, the folded imaging path camera can include a mirror 230 as shown at 232 to fold the reflected light of the image along the imaging path.

In these examples, the imaging path 214 directed through the camera lens module 224 is approximately perpendicular to an axis along which the reflected light of the image is received via the aperture 212 in the device 202. In the vertical configuration 216 of the folded imaging path camera in the device, the imaging path 214 that coincides with the optical axis of the camera lens module 224 is approximately parallel to an axis along the height dimension of the device. Alternatively, in the horizontal configuration 218 of the folded imaging path camera in the device, the imaging path 214 that coincides with the optical axis of the camera lens module 224 is approximately parallel to an axis along the width dimension of the device.

In embodiments, the camera lens module 224 can be implemented for reverse telephoto imaging, such as with a reverse telephoto lens that provides a large back focal length. A zoom mechanism can be implemented to translate the camera lens module parallel along the optical axis of the camera to increase or decrease the distance between the camera lens module 224 and the image sensor 226 to effectuate magnification of the image. In this example, the camera lens module can be implemented to travel between the prism 228 and the image sensor 226, or between the mirror 230 and the image sensor 226.

In embodiments, the folded imaging path camera 204 can be implemented for optical image stabilization and/or to generate high resolution images (e.g., also referred to as super resolution images) with a tilting lens. A tilting lens can be implemented as an additional element of the camera lens module 224, or the imaging lens of the camera lens module may be implemented as a tilting lens. A tilting lens can be implemented with a liquid lens or a liquid crystal lens that provides variable focus and variable tilt for both auto-focus and optical image stabilization. In an implementation, the device 202 includes orientation sensors 234, such as one or more gyroscopes, and the tilting lens can be tilted to compensate for camera shake based on sensor inputs 236, such as gyroscopic inputs from the one or more gyroscopes. Alternatively or in addition, the imaging lens of the camera lens module can be tilted with implementation of any one or combination of a MEMS actuator, VCM actuator, Piezo actuator, or other type of tilting mechanism.

In this example, the device 202 also includes an image processing service 238 that processes image data 240, such as the image data captured with the image sensor 226. For implementations of a super or high resolution technique, the image data for an image is captured at a nominal position and then also at one-half pixel offsets in the +X, −X, +Y, and/or −Y positions as the imaging lens is tilted. The image processing service can then combine the nominal position image (e.g., a digital image) and the various offset position images (e.g., additional digital images) to generate a high resolution image. The device 202 can also be implemented with various components, such as one or more processors and memory that enables data storage. The processors and memory of the device can implement the image processing service 238 as computer-executable instructions, such as a software application, that is executable to implement embodiments described herein. The device may also include any number and combination of differing components as further described with reference to the example device shown in FIG. 7.

Figure 3:
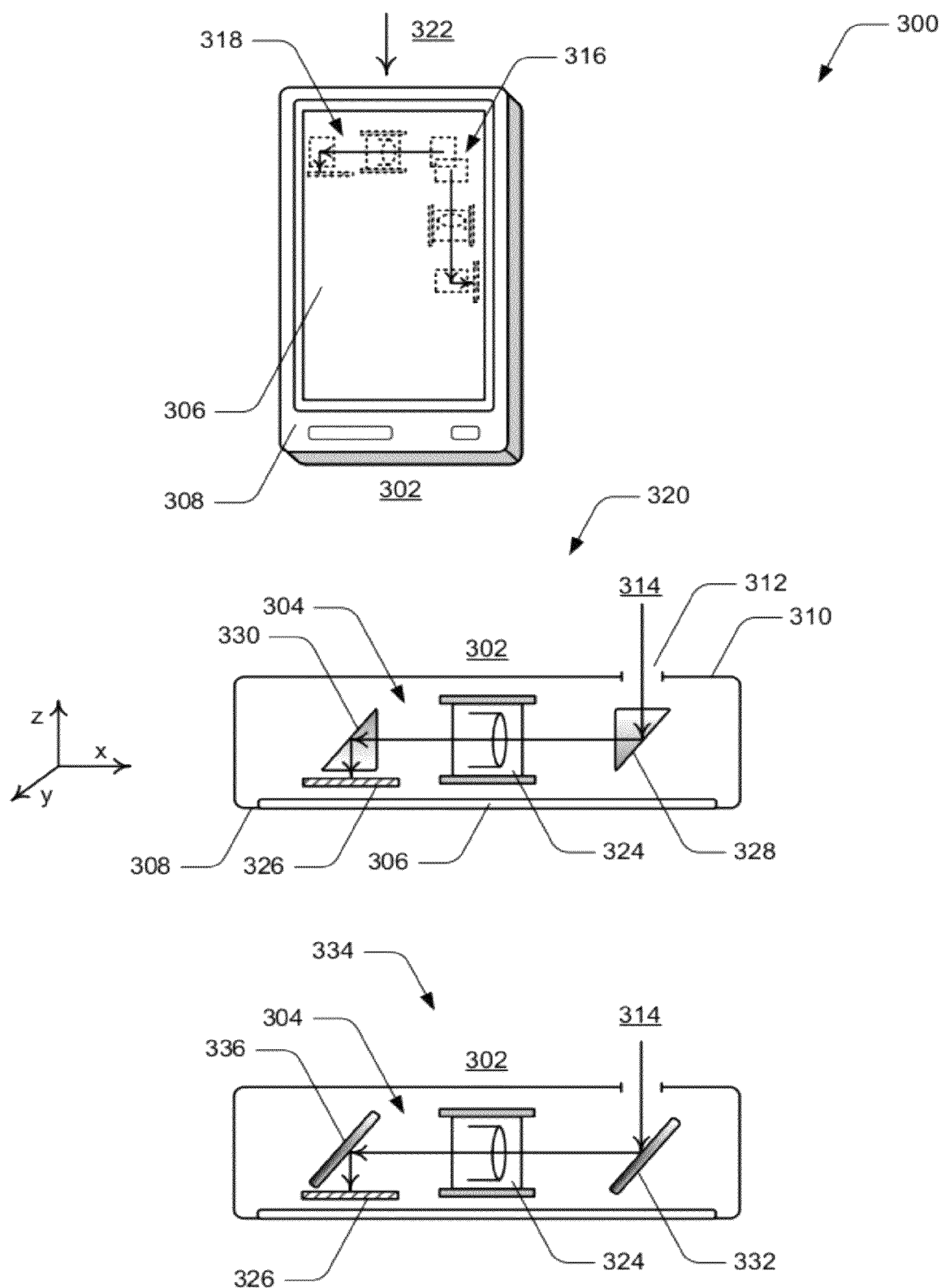
FIG. 3 illustrates additional examples of a device that includes implementations of a folded imaging path camera in accordance with one or more embodiments.

FIG. 3 illustrates examples 300 of a device 302 that includes implementations of a folded imaging path camera 304. The device 302 may be implemented as any type of device described with reference to FIG. 1. For example, the device may include a display 306 that is integrated in a front face 308 of the device. A back face 310 of the device includes an aperture 312 via which reflected light of an image is received and directed along an imaging path 314. Alternatively or in addition, the front face of the device may include an aperture through which the reflected light of the image is received. In embodiments, a folded imaging path camera can be implemented in a device in a vertical configuration 316. Alternatively, a folded imaging path camera can be implemented in a device in a horizontal configuration 318, as shown at 320 from the perspective 322.

The folded imaging path camera includes a camera lens module 324 with an autofocus mechanism and an image sensor 326. The camera lens module focuses the image received as the reflected light and the image sensor captures the image from the reflected light that is directed at the image sensor. The folded imaging path camera also includes optics, such as a prism 328 that first folds the reflected light of the image along the imaging path directed through the camera lens module and an additional prism 330 that second folds the reflected light of the image along the imaging path directed at the image sensor. Alternatively, the folded imaging path camera can include a mirror 332 as shown at 334 to first fold the reflected light of the image along the imaging path directed through the camera lens module and an additional mirror 336 that second folds the reflected light of the image along the imaging path directed at the image sensor.

In these examples, the imaging path 314 directed through the camera lens module 324 is approximately perpendicular to an axis along which the reflected light of the image is received via the aperture 312 in the device 302. In the vertical configuration 316 of the folded imaging path camera in the device, the imaging path 314 that coincides with the optical axis of the camera lens module 324 is approximately parallel to an axis along the height dimension of the device. Alternatively, in the horizontal configuration 318 of the folded imaging path camera in the device, the imaging path 314 that coincides with the optical axis of the camera lens module 324 is approximately parallel to an axis along the width dimension of the device.

In embodiments, the camera lens module 324 can be implemented for reverse telephoto imaging, such as with a reverse telephoto lens that provides a large back focal length. A zoom mechanism can be implemented to translate the camera lens module parallel along the optical axis of the camera to increase or decrease the distance between the camera lens module 324 and the image sensor 326 to effectuate magnification of the image. In this example, the camera lens module can be implemented to travel between the prism 328 and the additional prism 330, or between the mirror 332 and the additional mirror 336. As described with reference to the device shown in FIG. 2, the device 302 can include a tilting lens or lens tilting mechanisms, orientation sensors, and an image processing service to implement optical image stabilization and/or to generate high resolution images.

Figure 4:
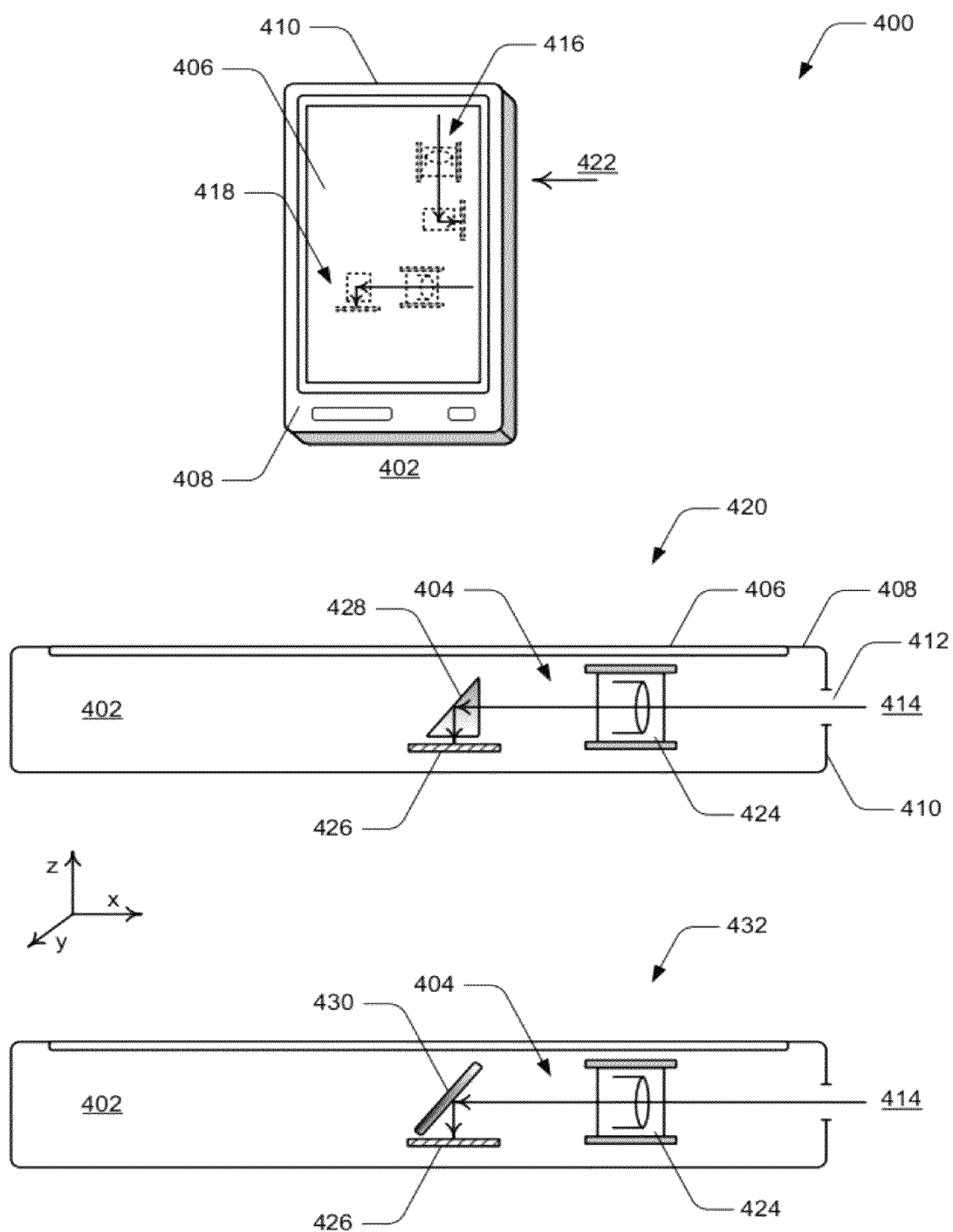
FIG. 4 illustrates additional examples of a device that includes implementations of a folded imaging path camera in accordance with one or more embodiments.

FIG. 4 illustrates examples 400 of a device 402 that includes implementations of a folded imaging path camera 404. The device 402 may be implemented as any type of device described with reference to FIG. 1. For example, the device may include a display 406 that is integrated in a front face 408 of the device. An end 410 of the device includes an aperture 412 via which reflected light of an image is received and directed along an imaging path 414. In this configuration, the device can be held and pointed like a television remote control to capture an image. Alternatively or in addition, the front face, back face, or any of the sides and ends of the device may include an aperture through which the reflected light of the image is received. In embodiments, a folded imaging path camera can be implemented in a device in a vertical configuration 416, as shown at 420 from the perspective 422. Alternatively, a folded imaging path camera can be implemented in a device in a horizontal configuration 418.

The folded imaging path camera includes a camera lens module 424 with an autofocus mechanism and an image sensor 426. The camera lens module focuses the image received as the reflected light and the image sensor captures the image from the reflected light that is directed at the image sensor. The folded imaging path camera also includes one or more optics, such as a prism 428 that folds the reflected light of the image along the imaging path from the camera lens module and directed at the image sensor. Alternatively, the folded imaging path camera can include a mirror 430 as shown at 432 to fold the reflected light of the image along the imaging path.

In these examples, the imaging path 414 through the camera lens module 424 is approximately parallel to an axis along which the reflected light of the image is received via the aperture 412 in the device 402. In the vertical configuration 416 of the folded imaging path camera in the device, the imaging path 414 that coincides with the optical axis of the camera lens module 424 is approximately parallel to an axis along the height dimension of the device. Alternatively, in the horizontal configuration 418 of the folded imaging path camera in the device, the imaging path 414 that coincides with the optical axis of the camera lens module 424 is approximately parallel to an axis along the width dimension of the device.

In embodiments, the camera lens module 424 can be implemented for reverse telephoto imaging, such as with a reverse telephoto lens that provides a large back focal length. A zoom mechanism can be implemented to translate the camera lens module parallel along the optical axis of the camera to increase or decrease the distance between the camera lens module 424 and the image sensor 426 to effectuate magnification of the image. In this example, the camera lens module can be implemented to travel between the aperture 412 and the prism 428, or between the aperture 412 and the mirror 430. As described with reference to the device shown in FIG. 2, the device 402 can include a tilting lens or lens tilting mechanisms, orientation sensors, and an image processing service to implement optical image stabilization and/or to generate high resolution images.

Example methods 500 and 600 are described with reference to respective FIGS. 5 and 6 in accordance with one or more embodiments of a folded imaging path camera. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
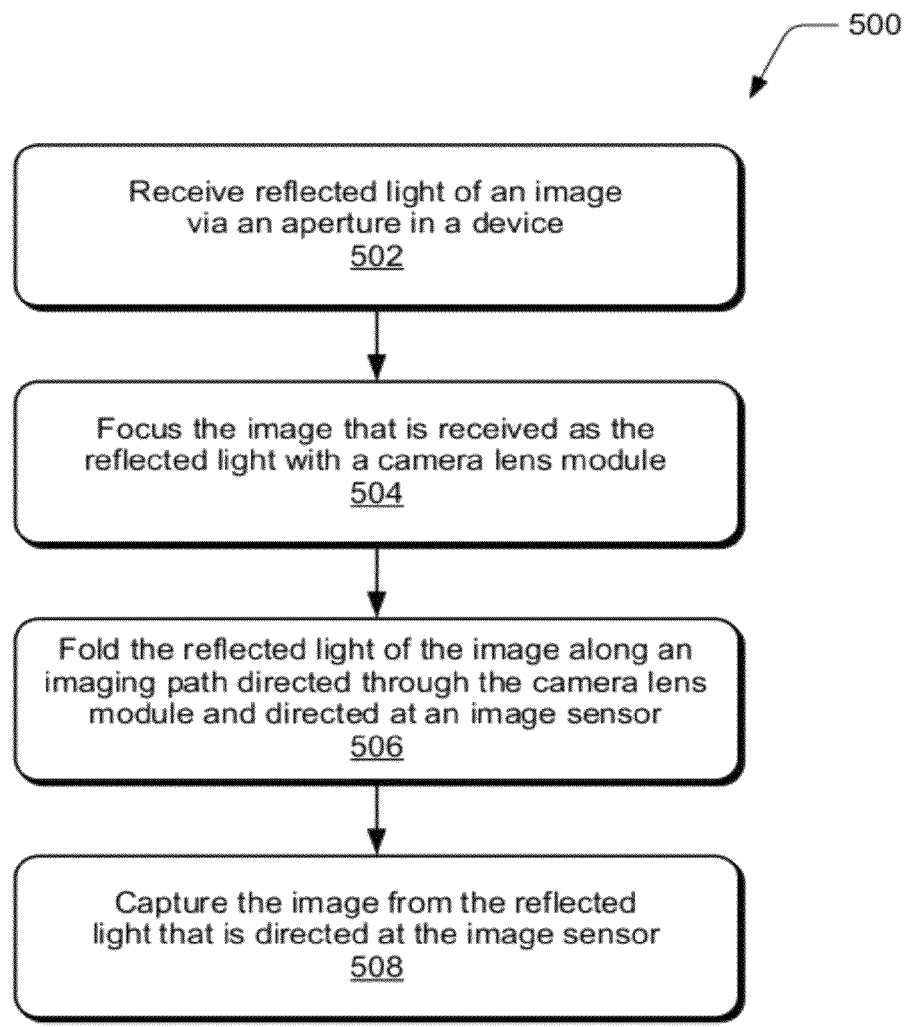
FIG. 5 illustrates example method(s) of a folded imaging path camera in accordance with one or more embodiments.

FIG. 5 illustrates example method(s) 500 of a folded imaging path camera. The order in which the method blocks are described are not intended to be construed as a limitation, and any number of the described method blocks can be combined in any order to implement a method, or an alternate method.

At block 502, reflected light of an image is received via an aperture in a device. For example, the device 202 (FIG. 2) receives reflected light of an image via the aperture 212 in the back face 210 of the device, and the reflected light of the image is directed along the imaging path 214. Similarly, device 302 (FIG. 3) receives reflected light of an image via the aperture 312 in the back face 310 of the device, and the reflected light of the image is directed along the imaging path 314. Similarly, the device 402 (FIG. 4) receives reflected light of an image via the aperture 412 in the end 410 of the device, and the reflected light of the image is directed along the imaging path 414.

At block 504, the image that is received as the reflected light is focused with a camera lens module. For example, the camera lens module 224 in the device 202 focuses the image received as the reflected light. Similarly, the camera lens module 324 in the device 302 focuses the image received as the reflected light, and the camera lens module 424 in the device 402 focuses the image received as the reflected light.

At block 506, the reflected light of the image is folded along an imaging path directed through the camera lens module and directed at an image sensor. For example, the prism 228 or mirror 230 (e.g., one or more optics) in the device 202 folds the reflected light of the image along the imaging path 214 directed through the camera lens module 224 and directed at the image sensor 226. In this example, the imaging path directed through the camera lens module is approximately perpendicular to an axis along which the reflected light of the image is received, and the reflected light is folded once along the imaging path. In another example, the prisms 328, 330 and/or mirrors 332, 336 (e.g., one or more optics) in the device 302 folds the reflected light of the image along the imaging path 314 directed through the camera lens module 324 and directed at the image sensor 326. In this example, the imaging path directed through the camera lens module is also approximately perpendicular to an axis along which the reflected light of the image is received. The reflected light is first folded along the imaging path directed through the camera lens module and second folded directed at the image sensor.

In another example, the prism 428 or mirror 430 (e.g., one or more optics) in the device 402 folds the reflected light of the image along the imaging path 414 through the camera lens module 424 and directed at the image sensor 426. In this example, the imaging path through the camera lens module is approximately parallel to an axis along which the reflected light of the image is received via the aperture 412 in the end of the device, and the reflected light is folded and directed at the image sensor.

At block 508, the image is captured from the reflected light that is directed at the image sensor. For example, the camera lens module 224 in the device 202 focuses the image received as the reflected light and the image sensor 226 captures the image from the reflected light that is directed at the image sensor. Similarly, the camera lens module 324 in the device 302 focuses the image received as the reflected light and the image sensor 326 captures the image from the reflected light that is directed at the image sensor. Similarly, the camera lens module 424 in the device 402 focuses the image received as the reflected light and the image sensor 426 captures the image from the reflected light that is directed at the image sensor.

Figure 6:
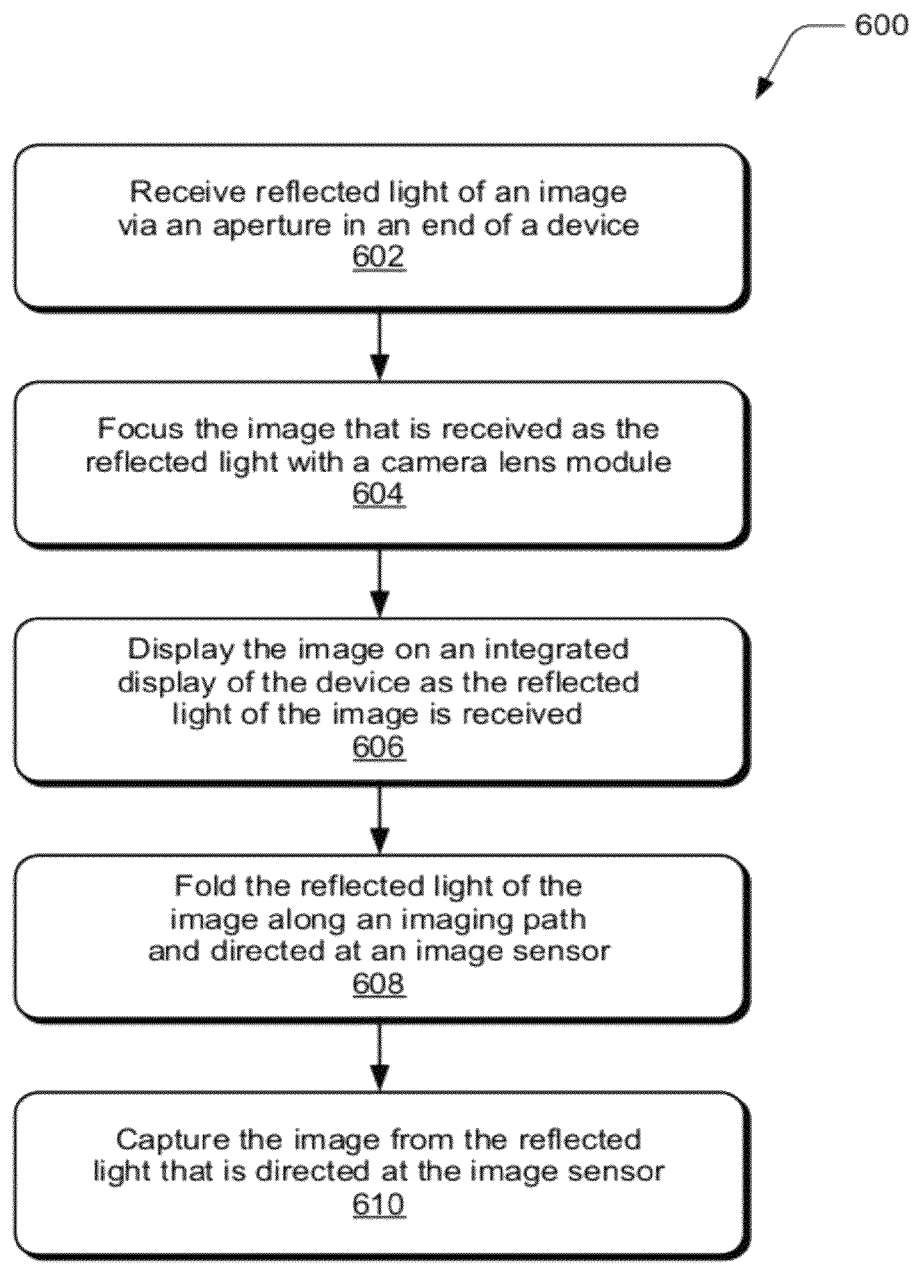
FIG. 6 illustrates example method(s) of a folded imaging path camera in accordance with one or more embodiments.

FIG. 6 illustrates example method(s) 600 of a folded imaging path camera. The order in which the method blocks are described are not intended to be construed as a limitation, and any number of the described method blocks can be combined in any order to implement a method, or an alternate method.

At block 602, reflected light of an image is received via an aperture in an end of a device. For example, the device 402 (FIG. 4) receives reflected light of an image via the aperture 412 in the end 410 of the device, and the reflected light of the image is directed along the imaging path 414 through the camera lens module 424. In this example, the imaging path through the camera lens module is approximately parallel to an axis along which the reflected light of the image is received via the aperture in the end of the device.

At block 604, the image that is received as the reflected light is focused with the camera lens module. For example, the camera lens module 424 in the device 402 focuses the image received as the reflected light. At block 606, the image is displayed on an integrated display of the device as the reflected light of the image is received. For example, the display 406 that is integrated in the front face 408 of the device 402 displays the image as it is received, such as when a user views the image to be captured before initiating capture of the image (e.g., taking a photo).

Dimensions of the device 402 include a height dimension, a width dimension, and a depth dimension (e.g., as described with reference to device 100 shown in FIG. 1). The front face 408 of the device is defined by the height dimension and the width dimension, and the front face includes the integrated display. The ends of the device are defined by the width dimension and the depth dimension, and the sides of the device are defined by the height dimension and the depth dimension. In this example, the imaging path 414 from the aperture 412 and through the camera lens module 424 is approximately parallel to an axis along the height dimension of the device.

At block 608, the reflected light of the image is folded along the imaging path and directed at an image sensor. For example, the prism 428 or mirror 430 (e.g., one or more optics) in the device 402 folds the reflected light of the image along the imaging path 414 through the camera lens module 424 and directed at the image sensor 426. In this example, the imaging path from the aperture and through the camera lens module is approximately parallel to a horizontal plane of the integrated display. At block 610, the image is captured from the reflected light that is directed at an image sensor. For example, the image sensor 426 in the device 402 captures the image from the reflected light that is directed at the image sensor.

Figure 7:
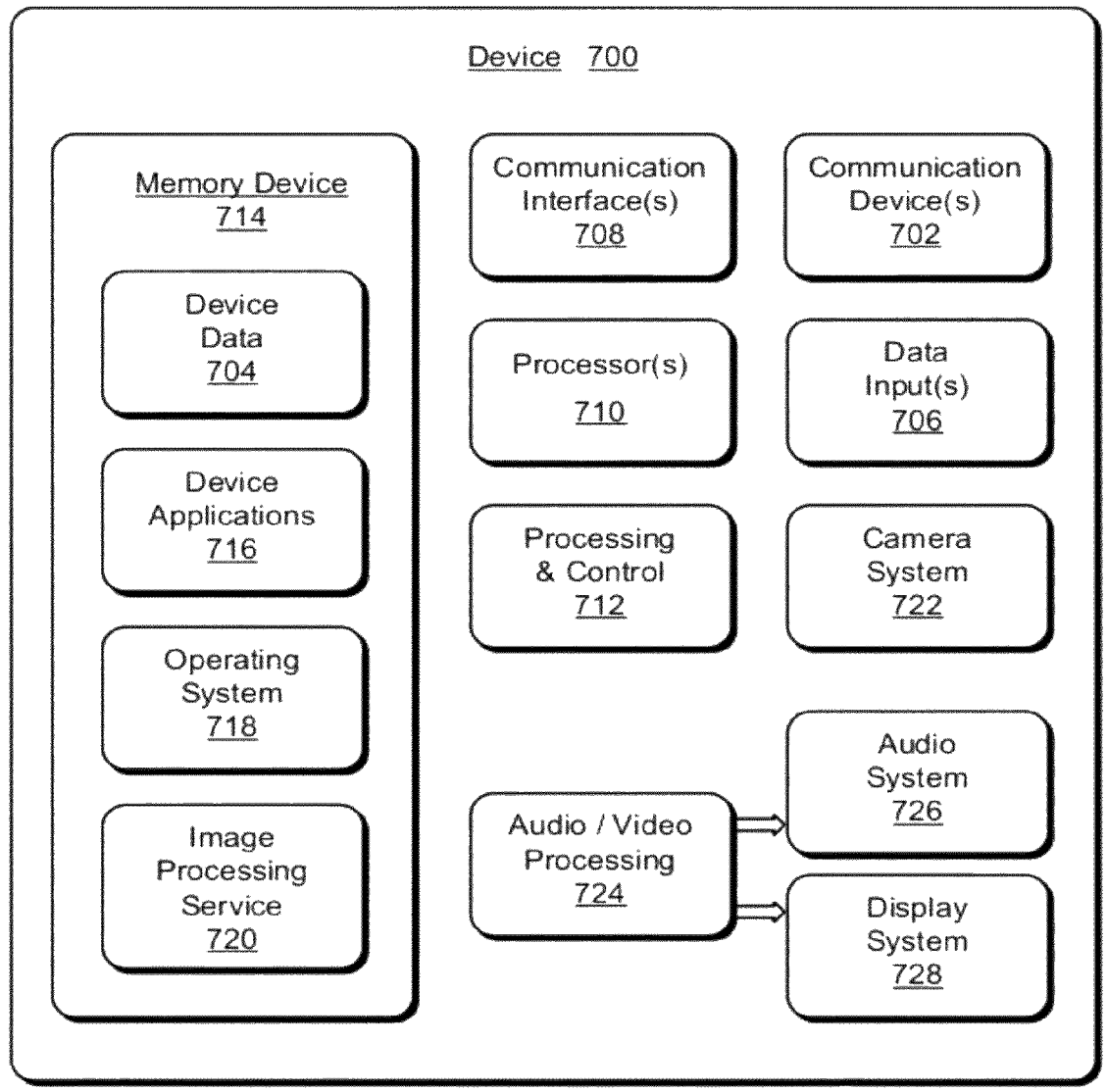
FIG. 7 illustrates various components of an example device that can implement embodiments of a folded imaging path camera.

FIG. 7 illustrates various components of an example device 700 that can be implemented as any of the devices, or services implemented by devices, described with reference to the previous FIGS. 1-6. In embodiments, the device may be implemented as any one or combination of a fixed or mobile device, in any form of a consumer, computer, portable, user, communication, phone, navigation, appliance, gaming, media playback, camera, and/or electronic device. The device may also be associated with a user (i.e., a person) and/or an entity that operates the device such that a device describes logical devices that include users, software, firmware, hardware, and/or a combination of devices.

The device 700 includes communication devices 702 that enable wired and/or wireless communication of device data 704, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 706 via which any type of data, media content, and/or inputs can be received, such as user-selectable inputs, messages, communications, music, television content, recorded video content, and any other type of audio, video, and/or image data received from any content and/or data source.

The device 700 also includes communication interfaces 708, such as any one or more of a serial, parallel, network, or wireless interface. The communication interfaces provide a connection and/or communication links between the device and a communication network by which other electronic, computing, and communication devices communicate data with the device.

The device 700 includes one or more processors 710 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 712. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 700 also includes one or more memory devices 714 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 714 provides data storage mechanisms to store the device data 704, other types of information and/or data, and various device applications 716. For example, an operating system 718 can be maintained as a software application with a memory device and executed on the processors. The device applications may also include a device manager, such as any form of a control application, software application, signal processing and control module, code that is native to a particular device, a hardware abstraction layer for a particular device, and so on. In this example, the device applications 716 include an image processing service, such as when the device 700 is implemented with a camera system 722 that captures digital images.

The device 700 also includes an audio and/or video processing system 724 that generates audio data for an audio system 726 and/or generates display data for a display system 728. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of a folded imaging path camera have been described in language specific to features and/or methods, the subject of the appended claims is not necessarily limited to the specific features or methods described. Rather, the specific features and methods are disclosed as example implementations of a folded imaging path camera.

The invention claimed is:

1. A device, comprising:
   a camera lens module configured to focus an image that is received as reflected light, the camera lens module comprising one or more lenses, the one or more lenses including an imaging lens configured to tilt for optical image stabilization;
   an image sensor configured to capture the image from the reflected light that is directed at the image sensor; and
   one or more optics configured to fold the reflected light of the image along an imaging path that is directed by the one or more optics through the camera lens module and directed at the image sensor.

2. A device as recited in claim 1, wherein the imaging path directed through the camera lens module is at least one of approximately perpendicular to an axis along which the reflected light of the image is received via an aperture in the device, or approximately parallel to an axis along which the reflected light of the image is received via the aperture in the device.

3. A device as recited in claim 1, further comprising at least a memory and a processor to implement an image processing service that is configured to combine a digital image at a nominal position with one or more offset position digital images to generate a high resolution image.

4. A device as recited in claim 3, wherein the imaging lens configured to tilt is tilted approximately one-half pixel offsets to capture the one or more offset position digital images.

5. A device as recited in claim 1, wherein the reflected light of the image is received via an aperture in an end of the device, the end of the device defined by a width dimension and a depth dimension of the device, and wherein the imaging path directed through the camera lens module is approximately parallel to an axis along which the reflected light of the image is received.

6. A device as recited in claim 5, wherein an optical axis of the camera lens module is approximately parallel to at least one of the first axis along the height dimension of the device, or the second axis along the width dimension of the device.

7. A device as recited in claim 1, wherein dimensions of the device include a height dimension, a width dimension, and a depth dimension, and wherein the imaging path is approximately parallel, at least in part, to at least one of a first axis along the height dimension of the device, or a second axis along the width dimension of the device.

8. A device as recited in claim 1, wherein the camera lens module is implemented for reverse telephoto imaging and configured to at least one of increase or decrease a distance between the camera lens module and the image sensor.

9. A device as recited in claim 1, wherein the one or more optics fold the reflected light once along the imaging path directed through the camera lens module and directed at the image sensor.

10. A device as recited in claim 1, wherein the one or more optics first fold the reflected light along the imaging path directed through the camera lens module and second fold the reflected light directed at the image sensor.

11. A method, comprising:
    focusing an image that is received as reflected light with a camera lens module, the camera lens module comprising at least an imaging lens and a tilting lens;
    folding the reflected light along an imaging path that is directed by one or more optics through the camera lens module and directed at an image sensor, the one or more optics located along the imaging path at least between an aperture of a device and the camera lens module and additionally between the camera lens module and the image sensor;
    stabilizing the image that is received as reflected light with the camera lens module using the tilting lens included in the camera lens module; and
    capturing the image from the reflected light that is directed at the image sensor.

12. A method as recited in claim 11, further comprising receiving the reflected light of the image via the aperture in the device, and wherein the imaging path directed through the camera lens module is approximately perpendicular to an axis along which the reflected light of the image is received.

13. A method as recited in claim 11, further comprising receiving the reflected light of the image via the aperture in the device, and wherein the imaging path directed through the camera lens module is approximately parallel to an axis along which the reflected light of the image is received.

14. A method as recited in claim 11, further comprising receiving the reflected light of the image via the aperture in an end of the device, and wherein the imaging path directed through the camera lens module is approximately parallel to an axis along which the reflected light of the image is received.

15. A method as recited in claim 11, wherein the reflected light is folded once along the imaging path directed through the camera lens module and directed at the image sensor.

16. A method as recited in claim 11, wherein the reflected light is first folded along the imaging path directed through the camera lens module and second folded directed at the image sensor.

17. A device, comprising:
    a camera lens module comprising one or more lenses configured to focus an image that is received as reflected light;
    a tilting lens, included in the camera lens module, configured to tilt to provide optical image stabilization;
    an integrated display configured to display the image as the image is received;
    an aperture in an end of the device via which the reflected light of the image is received along an imaging path through the camera lens module;
    an image sensor configured to capture the image from the reflected light that is directed at the image sensor; and
    one or more optics configured to fold the reflected light of the image along the imaging path and directed at the image sensor.

18. The device as recited in claim 17, wherein the imaging path from the aperture and through the camera lens module is approximately parallel to a horizontal plane of the integrated display.

19. The device as recited in claim 17, wherein the imaging path through the camera lens module is approximately parallel to an axis along which the reflected light of the image is received via the aperture in the end of the device.

20. The device as recited in claim 17, wherein:
    dimensions of the device include a height dimension, a width dimension, and a depth dimension;

a front face of the device is defined by the height dimension and the width dimension of the device, and the front face includes the integrated display;

the end of the device is defined by the width dimension and the depth dimension of the device; and wherein the imaging path from the aperture and through the camera lens module is approximately parallel to an axis along the height dimension of the device.

\* \* \* \* \*